No. 761,700. PATENTED JUNE 7, 1904.
T. NIELSEN & G. C. H. PRÆST.
COMBINED FLUE AND WATER TUBE STEAM GENERATOR.
APPLICATION FILED FEB. 4, 1903.
NO MODEL.
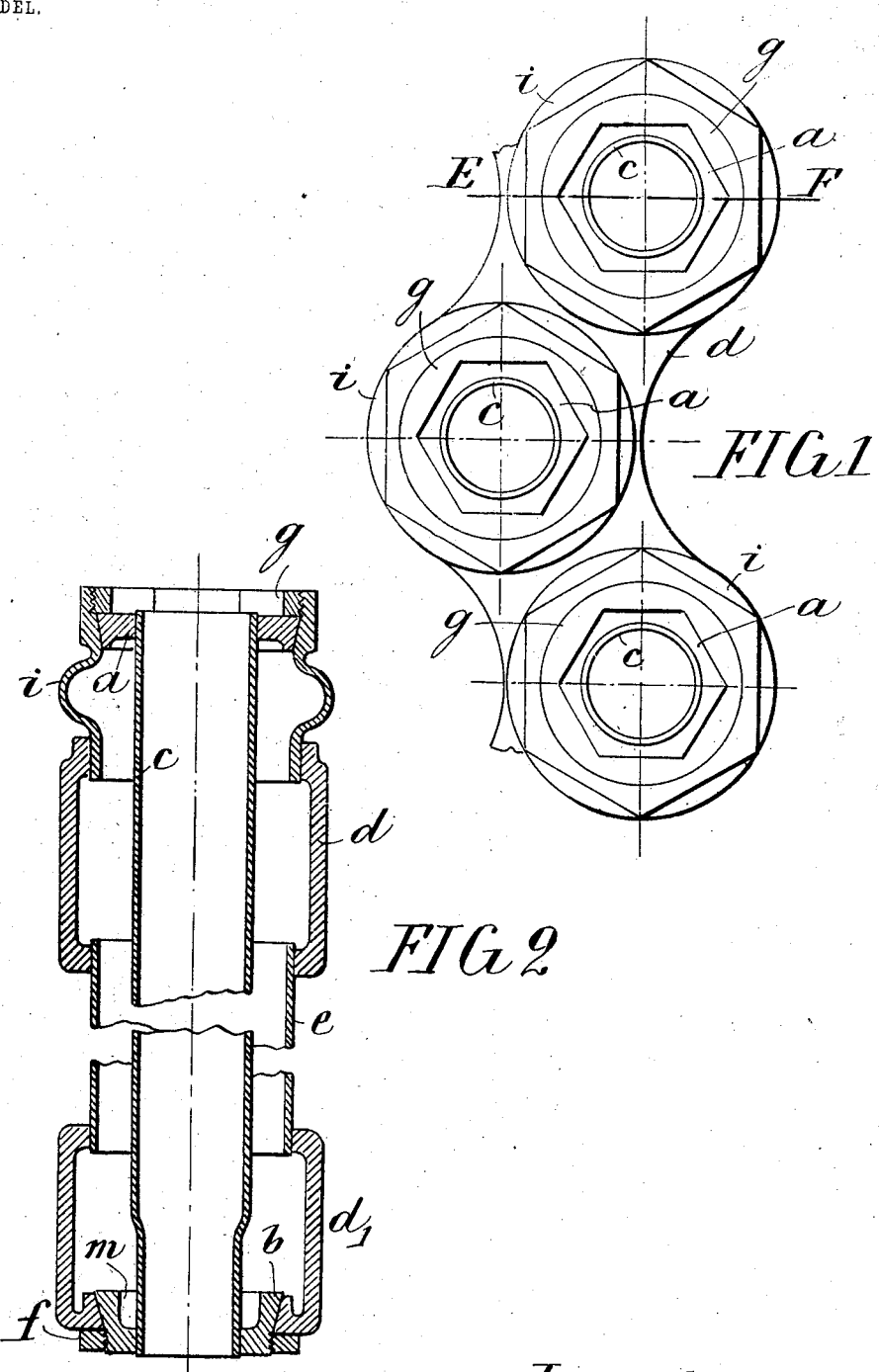

No. 761,700.

Patented June 7, 1904.

UNITED STATES PATENT OFFICE.

THOMAS NIELSEN AND GOTTFRED CARL HENRIK PRÆST, OF NORDBY, DENMARK.

COMBINED FLUE AND WATER TUBE STEAM-GENERATOR.

SPECIFICATION forming part of Letters Patent No. 761,700, dated June 7, 1904.

Application filed February 4, 1903. Serial No. 141,891. (No model.)

*To all whom it may concern:*

Be it known that we, THOMAS NIELSEN and GOTTFRED CARL HENRIK PRÆST, subjects of the King of Denmark, residing at Nordby, Fanö, Denmark, have invented certain new and useful Improvements in a Combined Flue and Water Tube Steam-Generator, of which the following is a specification.

The present invention relates to improvements in the arrangement of and connection between the water and flue tubes, through which improvements is obtained an essential security in respect to tensions in the flue-tubes by unequal heating of said tubes and to too great a heating at the ends of the tube-fittings, at the same time as facility for dismounting for the purpose of cleaning or the like.

An embodiment of the invention is shown, and described with reference to the accompanying drawings.

Figure 1 shows a broken front or end view of a water vessel, and Fig. 2 a horizontal sectional view on the line E F in Fig. 1.

The system of tubes comprises a plurality of water vessels $d$ $d'$ of the known kind with corrugated side surfaces. $d$ is the foremost vessel, and $d'$ the hindmost, which is adjacent to the combustion-chamber. These water vessels are connected by water-tubes $e$, and through each alined set of water-tubes $e$ there passes a flue-tube $c$. Alined with the water-tubes there are in the outer wall of the water vessel $d$ openings for cleaning, each of said openings being closed, with a pipe $i$ fixed in the water vessel $d$ and provided with a thinner expanded wall, to which part of the pipe $i$ the expansion of the corresponding flue-tube $c$ is transferred. Each pipe $i$ has near its outer end a conical seating $i'$, in which fits a corresponding externally-conical ring $a$ on the end of the flue-tube $c$, and said ring $a$ is firmly fastened in the seating $i'$ by means of a nut $g$, screwed interiorly into the end of the pipe $i$. On the other end of the flue-tube $c$ is arranged another conical ring $b$, which has on its inner or basic end a recessed cavity $m$ and fits in a corresponding conical seating $b'$ in the outer wall of the water vessel $d'$, to which it is fastened by means of a nut $f$, which abuts upon the outside of said vessel and is screwed upon the ring $b$. By tightening the nuts $f$ and $g$ the flue-tubes are fastened in the water vessels, and the expansions in said tubes when they are heated are transferred to the thinner expansible parts of the pipes $i$, which gives a partial or local elasticity to the whole system of tubes. The ring $b$ has its largest diameter a little smaller than the smallest diameter of the seating $i'$, so that by unscrewing the nuts $f$ and $g$ the flue-tubes $c$ may be taken out of the corresponding water-tubes $e$ without taking out the pipes $i$. Dismounting and cleaning of the tubes are made easier, and the pipes $i$ may be very firmly secured to the water vessel $d$. By the described arrangement of the flue-tubes it also will be seen that an essential security against too great a heating of the ends of said tubes is provided, since the water may circulate in the interior part of each ring $b$ and will thus lead away the heat from the outermost end of the tube $c$ and the ring $b$. At the same time the conical part of each ring $a$ and also the nut $g$ are so far removed from the outlet of the products of combustion that excessive heating of the said parts is avoided and tight joints are preserved.

We claim—

1. In a tubulous boiler, the combination of a system of water vessels, water-tubes connecting them, and flue-tubes traversing said water-tubes, one extreme water vessel having in its exterior wall conical seatings, pipes closing the openings for cleaning in the exterior wall of the other extreme water vessel, each of said pipes being provided with a thinner expanded wall and having a conical seating near its outer end, conical rings on the ends of the flue-tubes to engage said conical seatings, and nuts for forcing said rings on their seatings for the purpose set forth.

2. In a tubulous boiler, the combination of a system of water vessels, water-tubes connecting them, and flue-tubes traversing said water-tubes, one extreme water vessel having in its exterior wall conical seatings, pipes closing the openings for cleaning in the exterior wall of the other extreme water vessel, each of said pipes being provided with a thinner expanded wall and having a conical seating near its outer end, conical rings on the ends of the flue-tubes to engage said conical seatings, and nuts for forcing said rings on their seatings, said rings being each provided with an interior cavity in which water may circulate for the purpose set forth.

In witness whereof we have hereunto set our hands in presence of two witnesses.

THOMAS NIELSEN.
GOTTFRED CARL HENRIK PRÆST.

Witnesses:
JORGE MONINCKEL,
C. GONSALER.